United States Patent [19]

Le Dily, deceased et al.

[11] 4,196,405
[45] Apr. 1, 1980

[54] SELF-CORRECTING EQUALIZATION SYSTEM

[75] Inventors: Claude Le Dily, deceased, late of Epinay sur Orge, France; Le Dily, legal representative, by Joséphine, Noumea, New Caledonia; Jean-Claude Faye, Palaiseau, France

[73] Assignee: Compagnie Industrielle des Telecommunications Cit-Alcatel, Paris, France

[21] Appl. No.: 846,907

[22] Filed: Oct. 31, 1977

[30] Foreign Application Priority Data

Nov. 9, 1976 [FR] France .................. 76 33752

[51] Int. Cl.$^2$ .................. H03H 7/16; H04B 3/04
[52] U.S. Cl. .................. 333/16; 333/18; 333/167; 375/14; 364/572
[58] Field of Search .................. 333/16, 18, 70 T; 325/42, 65

[56] References Cited

U.S. PATENT DOCUMENTS 3,609,597  9/1971  Moye .................. 333/18
3,648,171  3/1972  Hirsch .................. 333/18 X
3,868,603  2/1975  Guidoux .................. 333/18

Primary Examiner—Paul L. Gensler
Attorney, Agent, or Firm—Roland Plottel

[57] ABSTRACT

The invention consists in an equalization system with two sections, one at each end of a transmission channel. The section at the transmission end adds control signals to information signals to be transmitted over the line. The section at the reception end generates control signals identical to those added at the transmission end and in phase with the control signals received over the transmission channel, which are separated from the received information signals by means of a first transversal filter with controllable weighting coefficients, the reciprocal transfer function of the transmission channel being synthesized from the locally generated and the received control signals by means of a second transversal filter with controllable weighting coefficients, equalization being achieved by means of a third transversal filter with the same design and same weighting coefficients as the second transversal filter. The invention is applicable to the transmission of data over telephone lines.

2 Claims, 1 Drawing Figure

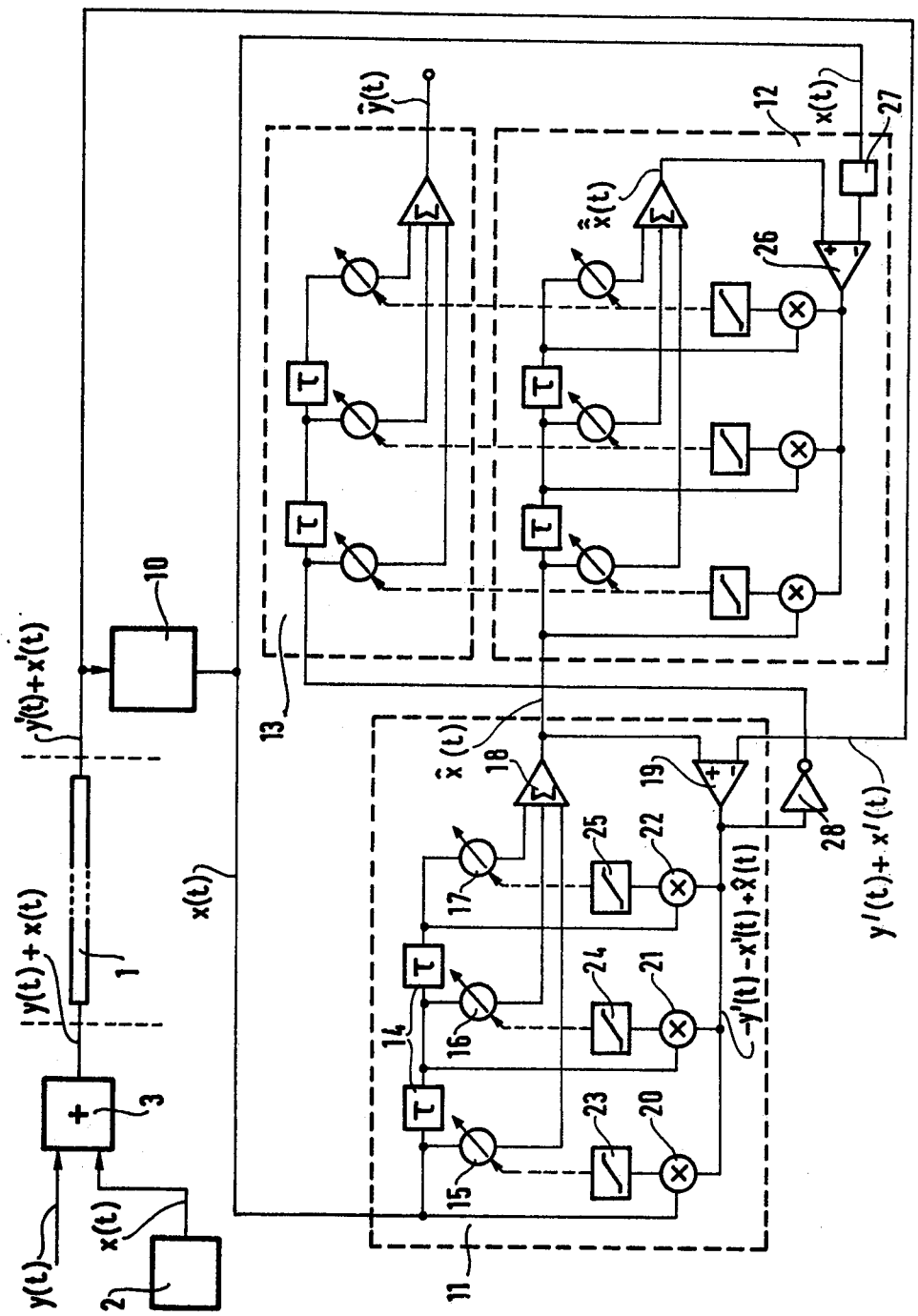

SELF-CORRECTING EQUALIZATION SYSTEM

The invention is concerned with the transmission of information.

Amplitude and phase distortion introduced by a transmission channel can be compensated by a process known as equalisation. Equalisation is particularly, but not exclusively, suited to the transmission of digital data over a telephone line, for the purpose of increasing the data flow rate. Equalisation of the line is carried out at the reception end, by means of an equalizer whose transfer function is as nearly identical to the reciprocal transfer function of the line as is possible. The result is a flat overall frequency response and linear phase characteristics over the whole of the frequency band utilised for the transmission of the signals.

The present invention is concerned with self-correcting equalisers with transfer functions which change with time in order to take due account of variations in the characteristics of the transmission channel. It is particularly concerned with equalisers using transversal filters which synthesise the overall filter response from the weighted sum of the partial responses at intermediate outputs of a cascaded reactive network. With this type of equaliser, self-correction is achieved by controlling the weighting coefficients so that they tend to converge to the optimum values at which the received signal corresponds as closely as possible with the transmitted signal. Such convergence is achieved with the aid of an error signal based on various criteria well-known to those skilled in the art, for example, by the minimum mean square error method, the hybrid method, and the forced zero method. The major problem lies in the creation of the error signal, since this must represent the difference between the equalised received signal and the signal prior to transmission, the form of the latter signal being often unknown or only partially known at the receiving end.

This problem is commonly overcome by preceding actual transmission of information with a trial period in which only a special signal is transmitted, the form of this signal being known at the reception end. The same signal is generated at the reception end, and compared with the received signal to generate an error signal. This trial period enables an equaliser at the reception end to be set up for the characteristics of the transmission channel. During transmission of the information, when the precise form of the transmitted signal is not known, certain broad characteristics of the transmitted signal, such as discrete values from which it must not depart, are used to generate an imperfect error signal. From this error signal, and by a process of convergence much slower than that obtaining during the trial period, it is possible to compensate for variations with time of the characteristics of the transmission channel.

Such self-correcting equalisers have the disadvantage that they are special-purpose units depending on specific characteristics of the transmitted signal.

The aim of the present invention is to provide a general purpose equaliser which can be used with all types of transmission channel, whatever the form of transmission signal utilised.

The invention consists in a self-correcting equalisation system for compensating for the non-linear characteristics of a transmission channel, the system comprising at the transmission end of the channel:

(a) a generator for producing control signals which are not correlated with the information signals to be sent over the transmission channel and (b) a summing circuit which adds the control signals to the information signals before the latter are input to the channel; and further comprising, at the reception end of the channel:

(c) a generator producing control signals identical to those produced at the transmission end of the channel and in phase with the control signals received over the channel;

(d) a first transversal filter comprising a cascaded reactive network with intermediate outputs and receiving at its input the control signals produced by the generator, the weighting coefficients of the first transversal filter being controlled so as to minimise the values of the functions correlating the signals at the terminals of its reactive network with the difference signal produced by its output signal and the signal at the output from the transmission channel;

(e) a second transversal filter comprising a cascaded reactive network with intermediate outputs and receiving at its input the output signal of the first transversal filter, the weighting coefficients of the second transversal filter being controlled so as to minimise the values of the functins correlating the signals at the terminals of its reactive network with the difference signal produced by its output signal and the control signals from the generator and (f) a third transversal filter with the same reactive network and weighting coefficients as the second transversal filter, receiving at its input the difference signal produced by the signal at the output of the transmission channel and the output signal of the first transversal filter, the output of the third transversal filter constituting the output of the equalisation system.

Other characteristics and advantages of the invention will emerge from the following description of an embodiment of the invention and from the appended claims. The following description is given by way of non-limiting example only and with reference to the accompanying drawing in which the single FIGURE is a block diagram of an equaliser in accordance with the invention.

Referring to the FIGURE, the equaliser includes non-recursive transversal filters with controllable weighting coefficients. It will be as well briefly to summarise the properties of such filters, as this will facilitate the understanding of the invention.

A non-recursive transversal filter consists of a cascaded reactive network with an input, an output and intermediate outputs, multipliers which enable weighting co-efficients to be applied to the signals at the outputs of the reactive network, and a summing circuit forming the weighted sum of the aforementioned signals. If a non-recursive transversal filter has $N+1$ terminals, including the input and principal output, if $\Gamma_o(t)$ to $\Gamma_n(t)$ are the signals at those terminals, and if $C_o$ to $C_n$ are the weighting coefficients applied to these signals by the multipliers, then the output signal $\hat{y}(t)$ of the filter is given by the following equation:

$$\hat{y}(t) = \sum_{k=o}^{n} C_k \Gamma_k(t)$$

Conventional filter theory indicates that it is possible to design certain types of reactive network with which it is possible to sythesise the transfer function of a circuit whose pulse response is of the summable squared type, merely by selecting suitable weighting co-efficients. There are two fundamental types of transversal filter, namely time domain filters and frequency domain filters. Time domain transversal filters use a delay line as the reactive network and relate the input signal and the pulse response of the synthesised circuit. Frequency domain transversal filters use a string of reactive elements in cascade, the transfer functions at the various outputs forming mutually orthogonal functions (e.g. Laguerre functions) from which the required transfer function can be synthesised by a weighted summing process.

In the case of equalisers, it is necessary to synthesise the reciprocal transfer function from the received signals. It is known that this can be done with time domain and with frequency domain transversal filters with controllable coefficients. The filter input must be fed with the input signal to the circuit, in the case of the direct transfer function, or with the circuit response in the case of the reciprocal transfer function, the wighting coefficients of the filter being adjusted to obtain the other signal (i.e., the circuit response in the case of the direct transfer function, and the (possibly delayed) input signal in the case of the reciprocal transfer function). The weighting coefficients are adjusted by varying them in such a way as to minimise the function correlating the signals $\Gamma_k(t)$ at the outputs of the reactive network of the transversal filter with an error signal representing the difference between the output signal of the filter and the required signal.

It can be shown that the mean quadratic error E between the output signal y(t) and the required signal y(t) which is given by the following equation:

$$E = \int_{-\infty}^{+\infty} (\hat{y}(t) - y(t))^2 \, dt =$$

$$\int_{-\infty}^{+\infty} \left[ \sum_{k=0}^{n} C_k \Gamma_k(t) - y(t) \right]^2 dt$$

is a convex function of the co-efficients $C_k$. There is a single minimum obtained with a zero sum of the partial differentials $\partial E/\partial C_k$. A simple calculation shows that these partial differentials are, except for a multiplying factor, the functions correlating the error signal $\hat{y}(t)$ - y(t) with the signal $\Gamma_k(t)$ at the outputs of the reactive network of the transversal filter.

Various methods (e.g., the method of least squares, the hybrid method and the forced zero method) have been developed for producing convergence of the weighting coefficients of a transversal filter to optimum values for which the functions correlating the error signal with the signals at the outputs of the filter cancel one another out. These methods consist in periodically modifying the values of the coefficients $C_k$ by quantities $\Delta_k$ of opposite sign to the aforementioned correlation functions and with values which are either fixed or dependent on said correlation functions, in the case of a system using logic circuitry.

To sum up, these considerations show that it is possible with known techniques to synthesise the direct or reciprocal transfer function of a circuit in a given frequency band, from the response of the circuit to a signal occupying that band. The input of the transversal filter must be fed with the circuit's input signal, in the case of the direct transfer function, or with the circuit's response, in the case of the reciprocal transfer function, and the weighting coefficients of the filter must be controlled in the known manner so as to minimise the values of the functions correlating the signals at the outputs of the reactive network of the filter with an error signal formed from the difference between the output signal of the filter and the required signal (circuit response in the case of the synthesis of the direct transfer function and the (possibly delayed) input signal to the circuit in the case of the synthesis of the reciprocal transfer function).

Prior art equalisers apply this result by using a nonrecursive transversal filter with controlled coefficients to synthesise the reciprocal transfer function of the transmission channel. The input signal to the transversal filter is the signal from the receiver, and the filter's weighting coefficients are controlled so as to minimise the functions correlating the signals at the outputs of the reactive network with a signal representing the difference between the output signal of the filter and a signal deemed to be identical to the transmitted signal. The problem with these equalisers is estimating the form of the transmitted signal when this is not known or only partially known at the receiving end. This estimate is generally based on specific and constant characteristics of the transmitted signal, which means that such equalisers are special-purpose units adapted only to this one type of transmitted signal.

In the equalisation system in accordance with the invention, this problem is overcome by using control signals whose form is exactly known at the receiving end. These signals are added to the information signals at the transmission end and separated out at the reception end. The distortion of these signals by the transmission channel indicates the transfer function of the channel, and enables the reciprocal transfer function to be determined.

The equalisation system shown in the drawing has two sections, one at the transmission end of the transmission channel 1 and the other at the reception end.

The section at the transmission end of the channel 1 comprises a control signal generator 2 and a summing circuit 3.

The control signals have an arbitrary but reproducible form, and are not correlated with the information signals. Their amplitude is much lower than that of the information signals, and their frequency spectrum advantageously extends across the whole of the band occupied by the information signals, so that the distortion of the control signals by the transmission channel is representative of the channel's response characteristics over the entire band. The control signals may consist, for example, of bipolar pseudo-random signals 20 dB down relative to the information signals and with a frequency spectrum extending right across the information signal band. The pseudo-random signal may be generated by the well-known method consisting in the use of a shift register with its input coupled to its output and to the outputs of certain intermediate stages via modulo 2 adding circuits. The shift register output signal is fed to a binary-to-bipolar transcoder.

The information signals from the output of a conventional modulator (not shown) and the control signals are added together in the summing circuit 3 and the resulting signal is applied to the transmission channel.

The section of the system at the reception end of the transmission channel comprises a control signal generator 10 and three non-recursive transversal filters 11, 12 and 13 shown within the rectangles in dashed outline.

The generator 10 provides control signals identical to those applied to the transmission end of the channel, and these are synchronised with the control signls received over the channel. Apart from the synchronisation circuitry, the generator 10 may be of similar design to the generator 2.

The synchronisation may be achieved by means of a digital phase loop. The error signal in such a device may be derived by correlating the locally generated signal with that received from the distant end. The integration period (which must be an integral multiple of the period of the bipolar pseudo-random sequence) is set by the accuracy of the quartz-controlled generators, which therefore determines the possibility of recognising the sequence contained within the information signal.

The first non-recursive transversal filter 11 is of the time domain type, and its weighting coefficients are controlled by the least squares method. Its input is connected to the output of the generator 10, and its reactive network consists of a delay line 14 which, to simplify the FIGURE, is shown as comprising only two elements. The input, intermediate output and final output of the delay line 14 are connected to respective attenuators 15, 16 and 17 serving as multipliers. Other inputs (not shown) of these attenuators receive the weighting co-efficients, and the attenuator outputs are connected to a summing circuit 18, the output signal of which constitutes that of the transversal filter 11.

The weighting coefficients fed to the attenuators 15, 16 and 17 are adjusted, by the least squares method, so as to minimise the values of the functions correlating the signals at the input, intermediate output and final output of the delay line 14 with an error signal consisting of the difference between the output signal of the transversal filter 11 and the signal received over the transmission channel 1.

The error signal is derived by a subtractor circuit 19 with one input connected to the output of the summing circuit 18 and its other input connected to the output of the transmission channel 1.

Multipliers 20, 21 and 22 are respectively connected to the input, intermediate output and final output of the delay line 14, and also receive the error signal from the subtracting circuit 19. Their outputs are connected to respective integrators 23, 24 and 25, which provide the correlation functions. The weighting coefficients of the attenuators 15, 16 and 17 are determined by the integrators 23, 24 and 25, respectively, as shown schematically in the FIGURE by means of the dashed arrows. The weighting coefficients are fed to the attenuators via update circuits (not shown) which execute the covergence algorithm utilised in the least squares method. Each new value $C_{kj}$ of a weighting coefficient $C_k$ is defined in terms of the preceding value $C_{kj-1}$ by the equation:

$$C_{kj} = C_{kj-1} - \alpha \int_{-\infty}^{+\infty} \Gamma_k(t) \, e(t) \, dt$$

where $\alpha$ is a positive constant which affects the rate of convergence and $e(t)$ is the error signal at the output of the subtracting circuit 19.

The correction term may be obtained, for example, by connecting a multiplier to the output of each integrator, to form the product of the constant $\alpha$ and each correlation function. This multiplication by $\alpha$ can be effected more easily at the level of the error signal. The convergence algorithm whereby the weighting coefficients are progressively modified towards their optimum values is effected by a memory preceded by a summing circuit forming an integrator with a long time constant.

The transversal filter 11 enables the transfer function of the transmission channel to be synthesised. At its input it receives the control signals $x(t)$ from generator 10 which occupy the whole of the transmitted frequency band. The above discussion of the theory of transversal filters of the time or frequency domain type and with controllable weighting coefficient shows that the transfer function of the transmission channel in the frequency band used by the transmitted signals and covered by the frequency spectrum of the control signals can be sythesised by means of a non-recursive transversal filter of the time or frequency domain type with weighting coefficients controlled so as to minimise the values of the functions correlating the signals at the terminals of the reactive network of the filter with an error signal representing the difference between the output signal $\hat{x}(t)$ of the filter and the response $x'(t)$ of the transmission channel to the control signals $x(t)$. The correlation functions are of the form:

$$\int_{-\infty}^{+\infty} \Gamma_k(t) \, (\hat{x}(t) - x'(t)) \, dt$$

The error signal also includes the response $y'(t)$ of the transmission channel to the information signals $y(t)$, so that the correlation functions actually used are of the form:

$$\int_{-\infty}^{+\infty} \Gamma_k(t) \, (\hat{x}(t) - x'(t) - y'(t)) \, dt$$

As compared with the previous functions, these have the additional term:

$$- \int_{-\infty}^{+\infty} \Gamma_k(t) \, y'(t) \, dt$$

This additional term is zero because the signals $y(t)$ to which the response of the transmission channel is $y'(t)$ are not correlated with the signals $x(t)$ which gives rise to the signals $\Gamma_k(t)$ at the terminals of the reactive network of the transversal filter.

In practice, the correlation functions are calculated over a finite period. The presence of the signal $y'(t)$ in the error signal used for controlling the weighting coefficients of the transversal filter 11 imposes a relatively slow process for the convergence of these coefficients (a relatively low value of $\alpha$). The calculation of the values of the correlation functions must cover a sufficiently long period for the values of the functions correlating the signal $y'(t)$ with the signals $\Gamma_k(t)$ at the terminals of the delay line of the transversal filter 11 to become negligible.

When the weighting coefficients of the first transversal filter 11 have converged to the optimum values for which the output signal $\hat{x}(t)$ of this filter is close to the response $x'(t)$ of the transmission channel to the control signals $x(t)$, the error signal at the output of the subtracting circuit is close to $-y'(t)$. The first transversal filter 11 thus synthesises the direct transfer function of the transmission channel, and also separates the channel's response y'(t) to the information signals y(t) from its response x'(t) to the control signals x(t).

The second transversal filter 12 is also of the non-recursive, time domain type with controllable weighting coefficients. It will not be described in detail, as its circuitry is much the same as that of the first transversal filter 11, whose ouput signal $\hat{x}(t)$ is applied to its input. Its weighting coefficients are adjusted to minimise the values of the functions correlating the signals at the terminals of its delay line with an error signal consisting of the difference between its output signal $\hat{x}(t)$ and the control signals x(t) from generator 10. Synthesis is facilitated if the signals x(t) are delayed by a delay circuit 27.

The error signal is obtained from a subtracting circuit 26 with one input connected to the output of the second transversal filter 12 and the other connected to the output generator 10 via the delay circuit 27, if the latter is included.

After convergence of the weighting coefficients of the first transversal filter, its output signal $\hat{x}(t)$ is close to the response x'(t) of the transmission channel to the control signals x(t). The above discussion of the properties of transversal filters with controllable weighting coefficients shows that the way in which the second transversal filter 12 is connected means that it synthesises the reciprocal transfer function of the transmission channel, except for the delay imposed by the circuit 27.

The second transversal filter 12 receives at its input a signal $\hat{x}(t)$ corresponding to the response x'(t) of the transmission channel to the control signals x(t), and its weighting coefficients are adjusted so as to minimise the values of the functions correlating the signals at the terminals of its delay line with an error signal which represents the difference between its output signal $\hat{x}(t)$ and the control signals x(t) from generator 10, delayed by the circuit 27 if the latter is used.

The third transversal filter 13 is also of the time domain type. It has a delay line identical to that of the second transversal filter 12, and the weighting coefficients of filters 12 and 13 are the same. The inputs of its weighting coefficient attenuators are paralleled with those of the second transversal filter 12. Because of its design and the way in which it is connected, the third transversal filter 13 synthesises the same transfer function as the second transversal filter 12, i.e., the reciprocal transfer function of the transmission channel, apart from the delay imposed by circuit 27. Its input is connected to the output of the subtracting circuit of the first transversal filter 11 via an inverter circuit 28, the output signal of which is the response y'(t) of the transmission channel to the information signals y(t). The output signal $\hat{y}(t)$ of the third transversal filter 13 is very close to the information signal y(t), as it results from applying the latter to two circuits connected in series, namely the transmission channel 1 and the third transversal filter 13, which have reciprocal transfer functions.

The inverter 28 may be omitted if the polarities of the subtracting circuit 19 are changed over and the device producing convergence of the coefficients is modified.

The equalisation system which has just been described may be connected into a transmission system downstream of the transmission equipment of the system and upstream of the reception equipment. In this way the line can be equalised independently of its destination.

As in the case of prior art equalisers, it is advantageous to precede the transmission of information with a trial period during which only the control signals are transmitted, followed by transmission of the combined information and control signals.

The advantage of using such a trial period is that it enables the weighting coefficients of the transversal filters to converge to their optimum values at a higher rate. The absence of the signals y'(t) in the weighting coefficient convergence loop of the first transversal filter 11 does away with the need for a calculation time sufficiently long for the functions correlating this signal with the signals at the terminals of the delay line of the filter to become negligible. The coefficient of the convergence algorithm can then be larger than in the information transmission stage, so that the weighting coefficients converge more quickly to their optimum values. This is all the more advantageous in so far as it is during the setting up of the equalisation system, when it is initially adapted to the characteristics of the transmission channel, that the variations in the weighting coefficients have the greatest values. During information transmission, the equalisation system has only to compensate for drift in the transmission channel characteristics, which are relatively slow and permit the long calculation times in respect of the convergence of the weighting coefficients required for those including the information signals to become negligible.

It will be obvious that other types of transversal filters than those described above may be used, especially non-recursive transversal filters using Laguerre reactive networks.

What we claim is:

1. A self-correcting equalisation system for compensating for the non-linear characteristics of a transmission channel, the system comprising, at the transmission end of the channel:
    (a) a generator for producing control signals x(t) which are not correlated with the information signals y(t) to be sent over the transmission channel; and
    (b) a summing circuit which adds the control signals x(t) to the information signals y(t) before the latter are input to the channel; and further comprising at the reception end of the channel:
    (c) a generator producing control signals x(t) identical to those produced at the transmission end of the channel and in phase with the control signals x'(t) received over the channel;
    (d) a first transversal filter comprising a cascaded reactive network with intermediate outputs and receiving at its input the control signals x(t) produced by the generator, the weighting coefficients of the first transversal filter being controlled so as to minimise the values of the functions correlating the signals at the terminals of its reactive network with the difference signals produced by its output signal $\hat{x}(t)$ and the signal y'(t)+x'(t) at the output from the transmission channel;
    (e) a second transversal filter comprising a cascaded reactive network with intermediate outputs and receiving at its input the output signal $\hat{x}(t)$ of the first transversal filter, the weighting coefficients of the second transversal filter being controlled so as to minimise the values of the functions correlating the signals at the terminals of its reactive network with the difference signal produced by its output signal $\overset{\wedge}{x}(t)$ and the control signal x(t) from the generator; and (f) a third transversal filter with the same reactive network and weighting coefficients as the second transversal filter, receiving at its input the difference signal produced by the signal y'(t)+x'(t) at the output of the transmission channel and the output signal $\overset{\wedge}{x}(t)$ of the first transversal filter, the output of the third transversal filter constituting the output of the equalisation system.

2. An equalisation system according to claim 1, wherein the control signals from the generator at the reception end of the channel are delayed by a delay circuit before being used in conjunction with the output signal $\overset{\wedge}{x}(t)$ of the second transversal filter for producing convergence of the weighting coefficients of the latter.

* * * * *